(12) United States Patent
Wilson et al.

(10) Patent No.: US 11,314,005 B2
(45) Date of Patent: Apr. 26, 2022

(54) ELECTRONIC DEVICE WITH INFRARED TRANSPARENT ONE-WAY MIRROR

(71) Applicant: Apple Inc., Cupertino, CA (US)

(72) Inventors: James R. Wilson, Cupertino, CA (US); James W. Vandyke, San Francisco, CA (US); Matthew S. Rogers, San Jose, CA (US)

(73) Assignee: Apple Inc., Cupertino, CA (US)

(\*) Notice: Subject to any disclaimer, the term of this patent is extended or adjusted under 35 U.S.C. 154(b) by 348 days.

(21) Appl. No.: 16/298,992

(22) Filed: Mar. 11, 2019

(65) Prior Publication Data

US 2019/0353836 A1    Nov. 21, 2019

Related U.S. Application Data

(60) Provisional application No. 62/673,062, filed on May 17, 2018.

(51) Int. Cl.
*G02B 5/28*    (2006.01)
*G02B 27/01*    (2006.01)
*G02B 5/20*    (2006.01)

(52) U.S. Cl.
CPC ............ *G02B 5/287* (2013.01); *G02B 5/208* (2013.01); *G02B 27/0172* (2013.01); *G02B 27/0179* (2013.01); *G02B 2027/0138* (2013.01); *G02B 2027/0187* (2013.01)

(58) Field of Classification Search
CPC .... G02B 5/287; G02B 5/208; G02B 27/0172; G02B 27/0179; G02B 2027/0138; G02B 2027/0187; G02B 5/08; G02B 27/0101; H05K 5/0017; H05K 5/03
See application file for complete search history.

(56) References Cited

U.S. PATENT DOCUMENTS

| | | | |
|---|---|---|---|
| 6,416,194 B1 * | 7/2002 | Demiryont | .............. C03C 17/36 359/359 |
| 6,512,624 B2 | 1/2003 | Tonar et al. | |
| 9,864,116 B2 | 1/2018 | Matsuyuki et al. | |

(Continued)

FOREIGN PATENT DOCUMENTS

| | | |
|---|---|---|
| CN | 1618079 A | 5/2005 |
| CN | 101057341 A | 10/2007 |

(Continued)

*Primary Examiner* — Kimberly N. Kakalec
(74) *Attorney, Agent, or Firm* — Treyz Law Group, P.C.; G. Victor Treyz; David K. Cole (57) ABSTRACT

An electronic device or other equipment may include an infrared-transparent one-way mirror. The infrared-transparent one-way mirror may be formed by a layer of material that is supported by a head-mounted support structure or other support structure. The support structure may support the layer of material so that the layer of material separates an exterior region from an interior region. Optical components in the interior region may be overlapped by the layer of material. The optical components may include visible light components such as a visible light camera and infrared components such as an infrared light-emitting device and an infrared light sensor. The optical components may operate through the layer of material while being hidden from view by the reflective appearance of the one way mirror from the exterior region.

24 Claims, 5 Drawing Sheets

(56) References Cited

U.S. PATENT DOCUMENTS

| | | |
|---|---|---|
| 2004/0233537 A1 | 11/2004 | Agrawal et al. |
| 2005/0084137 A1 | 4/2005 | Kim et al. |
| 2012/0145901 A1 | 6/2012 | Kakiuchi et al. |
| 2012/0170284 A1 | 7/2012 | Shedletsky |
| 2013/0063810 A1 | 3/2013 | Miyaguchi et al. |
| 2013/0229357 A1 | 9/2013 | Powell et al. |
| 2013/0235191 A1 | 9/2013 | Miao et al. |
| 2014/0118826 A1 | 5/2014 | Jiao et al. |
| 2015/0370071 A1 | 12/2015 | Alton et al. |
| 2016/0054175 A1 | 2/2016 | Jia et al. |
| 2016/0232828 A1 | 8/2016 | Jia et al. |
| 2016/0247341 A1* | 8/2016 | Talwerdi ............... G06K 15/02 |
| 2017/0184764 A1 | 6/2017 | Matsuyuki et al. |
| 2018/0067245 A1 | 3/2018 | Giachino et al. |
| 2019/0391307 A1* | 12/2019 | Wheatley ............... G02B 5/22 |

FOREIGN PATENT DOCUMENTS

| | | |
|---|---|---|
| CN | 201749208 U | 2/2011 |
| CN | 102730984 A | 10/2012 |
| CN | 106233168 A | 12/2016 |
| CN | 206872680 U | 1/2018 |
| CN | 107787473 A | 3/2018 |
| CN | 207336790 U | 5/2018 |
| CN | 210199340 U | 3/2020 |
| EP | 2565603 A2 | 3/2013 |
| WO | 2005043224 A2 | 5/2005 |

* cited by examiner

ELECTRONIC DEVICE WITH INFRARED TRANSPARENT ONE-WAY MIRROR

This application claims priority to U.S. provisional patent application No. 62/673,062, filed on May 17, 2018 which is incorporated by reference herein in its entirety.

FIELD

This relates generally to electronic devices, and, more particularly, to electronic devices with transparent layers.

BACKGROUND

Items such as sunglasses and ski googles are sometimes provided with coatings that create a one-way mirror effect. When the sunglasses or ski goggles are being worn by a user, these coatings may obscure the user's eyes from view.

Coatings for hiding internal components from view may be formed in electronic devices such as cellular telephones and computers. As an example, the underside of a cover glass layer in a cellular telephone may have coatings that hide internal components such as optical components from view while allowing these components to transmit or receive light through the coatings.

Challenges can arise when forming coatings to hide electronic device components. If care is not taken, coatings may not be sufficiently transparent to allow components to operate effectively or may not have a desired appearance.

SUMMARY

An electronic device or other equipment may include an infrared-transparent one-way mirror. The infrared-transparent one-way mirror may be formed by a layer of material that is supported by head-mounted support structure or other support structure.

The support structure in the electronic device may support the layer of material so that the layer of material separates an exterior region from an interior region. Optical components may be overlapped by the layer of material. The optical components may include visible light components such as a visible light camera and infrared components such as an infrared light-emitting device and an infrared light sensor. The optical components may operate through the layer of material while being hidden from view by the reflective appearance of the infrared-transparent one way mirror.

DETAILED DESCRIPTION

An electronic device may have a layer of one or more materials or other structure to separate interior and exterior regions. Light-based components may be located on an interior side of the layer. The layer of material may be transparent to infrared light so that infrared components such as infrared-light-emitting components and infrared-light-receiving components on the interior side of the layer can operate through the layer. At visible wavelengths, the layer may serve as a one-way mirror.

Due to the one-way mirror, the layer may reflect ambient light and appear shiny from the exterior. This blocks visible light components on the interior side of the layer from view. From the interior, the layer is sufficiently transparent to visible light to allow a user on the interior side of the layer to view objects through the layer and/or to allow visible-light components such as visible-light-emitting and visible-light-receiving components to operate through the layer.

The layer of material may be formed from one or more layers of dielectric, semiconductor, and/or conductor. Because the layer is configured to exhibit one-way mirror properties while being transparent to infrared light, the layer may sometimes be referred to as an infrared-transparent one-way mirror, an infrared-transparent one-way mirror layer or structure, etc.

Figure 1:
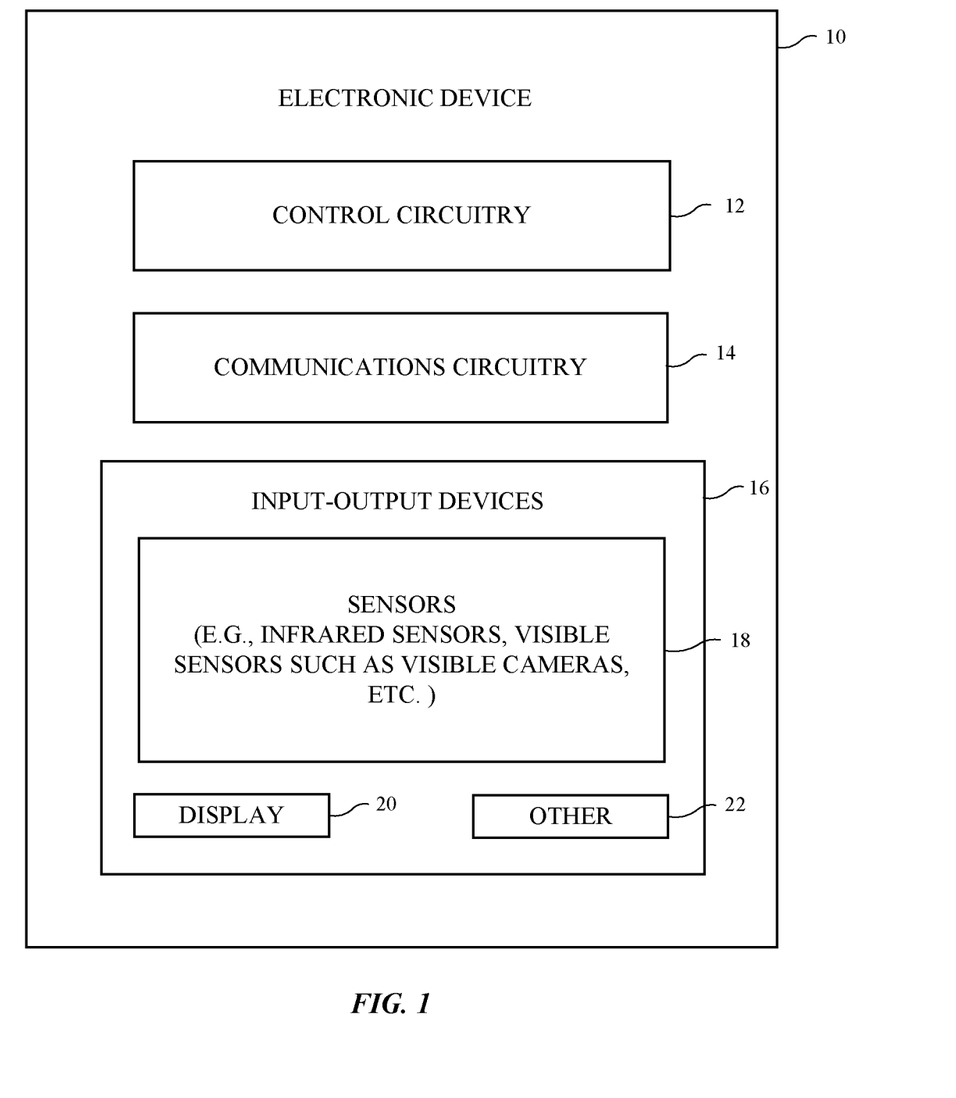
FIG. 1 is a schematic diagram of an illustrative electronic device in accordance with an embodiment.

An illustrative electronic device of the type that may include an infrared-transparent one-way mirror is shown in FIG. 1. As shown in FIG. 1, device 10 may include control circuitry 12, communications circuitry 14, and input-output devices 16. Device 10 may be a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices.

Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external electronic equipment, control circuitry 12 may communicate using communications circuitry 14. Communications circuitry 14 may include antennas, radio-frequency transceiver circuitry, and other wireless communications circuitry and/or wired communications circuitry. Circuitry 14, which may sometimes be referred to as control circuitry and/or control and communications circuitry, may, for example, support wireless communications using wireless local area network links, near-field communications links, cellular telephone links, millimeter wave links, and/or other wireless communications paths.

Input-output devices 16 may be used in gathering user input, in gathering information on the environment surrounding the user, and/or in providing a user with output. Devices 16 may include sensors 18. Sensors 18 may include force sensors (e.g., strain gauges, capacitive force sensors, resistive force sensors, etc.), audio sensors such as microphones, touch and/or proximity sensors such as capacitive sensors and/or other touch sensors and/or proximity sensors, optical sensors such as optical sensors that emit and detect light, ultrasonic sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), radio-frequency sensors (e.g., radar and other ranging and positioning sensors), depth sensors (e.g., structured light sensors and/or depth sensors based on stereo imaging devices), optical sensors such as self-mixing sensors and light detection and ranging (lidar) sensors that gather time-of-flight measurements and/or other measurements to determine distance and/or relative velocity, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors.

Input-output devices 16 may also include displays such as display 20. Displays 20 may be organic light-emitting diode displays, displays based on arrays of light-emitting diodes formed from crystalline semiconductor dies, liquid crystal displays, electrophoretic displays, microelectromechanical systems (MEMs) displays such as displays with arrays of moving mirrors, and/or other displays.

If desired, input-output devices 16 may include other devices 22. Devices 22 may include components such as status indicator lights (e.g., light-emitting diodes in devices 10 that serves as power indicators, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 22 may also include power transmitting and/or receiving circuits configured to transmit and/or receive wired and/or wireless power signals. Devices 22 may include buttons, rotating buttons, push buttons, joysticks, keys such as alphanumeric keys in a keyboard or keypad, microphones for gathering voice commands, touch sensor input devices, and/or other devices for gathering user input. Devices 22 may also include output components such as haptic output devices and other output components.

Figure 2:
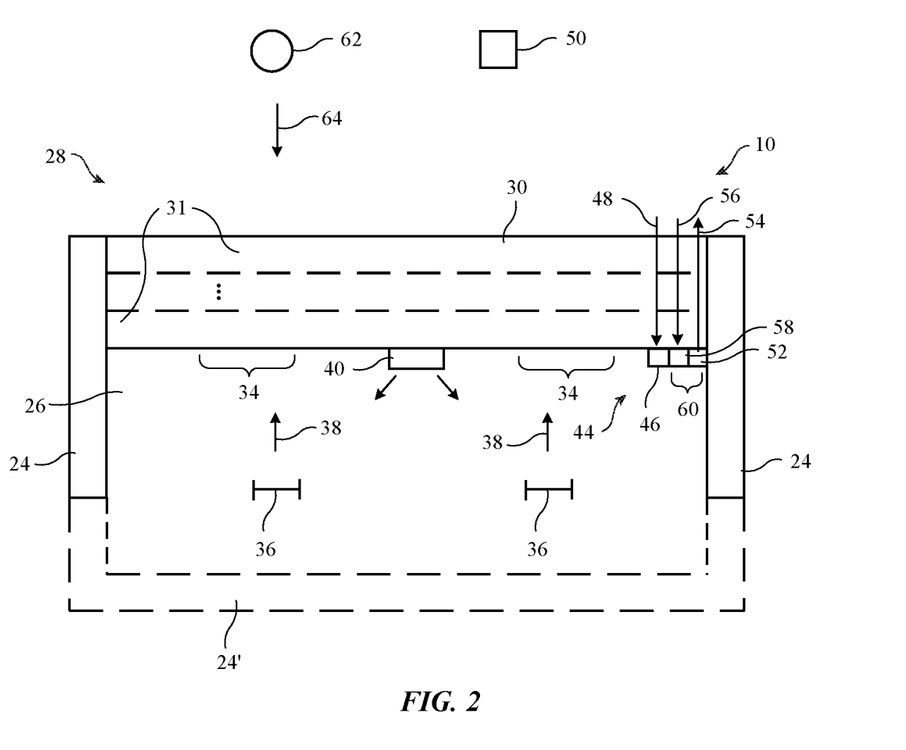
FIG. 2 is a top view of an illustrative electronic device in accordance with an embodiment.

In an illustrative arrangement, which may sometimes be described herein as an example, device 10 may be a head-mounted device. Consider, as an example, the arrangement of FIG. 2. As shown in FIG. 2, device 10 may have housing structures such as housing 24. Housing 24 may be formed form materials such as polymer, glass, metal, ceramic, fabric, wood, other materials, and/or combinations of these materials. Housing 24 may be used to support structures such as layer 30 that separate interior region (interior) 26 from exterior region (exterior) 28. In some configurations, housing 24 may have portions such as portion 24' that help enclose some or all of interior 26 and separate interior 26 from exterior 28 (e.g., when housing 24 forms portions of the body of a vehicle or forms an enclosure for a cellular telephone or computer. In these arrangements, printed circuits, integrated circuits, mechanical structures, and other components (see, e.g., control circuitry 12, communications circuitry 14 and/or input-output devices 16) may be located within the enclosure formed by housing 24. Components such as these may also be coupled to housing 24 via a cable (as an example). In some arrangements, components for device 10 may be embedded within hollow portions of housing 24.

If desired, housing 24 of FIG. 2 may be configured to form head-mounted support structures that hold device 10 on a head of a user (with or without a rear strap or other rear portion 24') and layer 30 may form a front portion for device 10 through which a user (e.g., user eyes in eye boxes 36) may view real-world objects such as illustrative real-world object 50 in exterior region 28. Gaze tracking system 40 may track a user's eyes located in eye boxes 36. A user's eyes in eye boxes 36 may view objects such as object 50 through layer 30 in direction 38. While viewing real-world objects, display 20 may present images to the user's eyes in eye boxes 36. For example, virtual content (images) may be displayed on display 20 and may be routed into a waveguide in layer 30 or adjacent to layer 30. Optical couplers in regions 34 may direct the images out of layer 30 toward eye boxes 36 for viewing by the user.

In other arrangements, device 10 may form a pair of virtual reality googles (e.g., one or more displays and optical systems may be mounted on the inner surface of layer 30 in regions 34 and may block a user's view through layer 30). If desired, device 10 may also be a device such as a cellular telephone, a computer, or other portable electronic device. In this type of arrangement, layer 30 may, as an example, form part of a housing for device 10 (e.g., a rear wall of device 10, etc.) or other portion of device 10 (e.g., an inactive portion of a display, etc.). Device 10 may also be a vehicle and may contain a motor, a vehicle body, steering equipment, and other vehicle components. In vehicles, layers such as layer 30 may form windows or parts of windows.

These configurations are illustrative. Other types of arrangements for device 10 may be used, if desired. Configurations in which device 10 is a head-mounted device, in which housing 24 forms a support structure(s) for layer 30 that is configured to allow device 10 to be worn on a head of the user, and in which layer 30 is a transparent layer through which a user may view real-world objects such as object 50 in exterior 28 while display 20 presents overlapped virtual content in eye boxes 36 in interior 26 are described herein as an example.

Layer 30 may include one or more sublayers such as layer 31. These layers may include substrate layers, interior and/or exterior coatings, coatings that serve to reflect light, absorb light, and/or transmit light of different wavelengths by desired amounts, and/or other materials. During operation, a person in the vicinity of device 10 such as external viewer 62, may view layer 30 and device 10 in direction 64. Due to the one-way mirror effect produced by layer 30, ambient light in exterior region 28 will illuminate layer 30 and will reflect off of layer 30. Interior 26 is generally dimmer than exterior 28, so bright ambient light in exterior 28 will overwhelm interior light that is transmitted through layer 30. As a result, external viewer 62 will not be able to view interior 26 through layer 30. This helps hide interior components such as light-based components 44 from view by external viewer 62.

As shown in FIG. 2, light-based components 44 may be mounted in interior region 26 adjacent to the interior surface of layer 30. Components 44 may include one or more visible light components such as visible-light component 46. Component 46 may be a light producing component including one or more light-emitting diodes, lasers, displays, or other light generating circuitry and/or may be a light detecting component including one or more photodetectors (e.g., photodiodes or phototransistors), digital image sensors (visible digital image sensors, sometimes referred to as visible cameras or visible-light cameras), and/or other visible light sensor circuitry. For example, component 46 may be a visible light camera (digital image sensor) configured to capture real-world images that are presented to a user of device 10 using display 20 (e.g., component 46 may be a visual pass-through camera) and/or a component 46 may be a camera configured to perform object tracking on real-world objects.

Components 44 may also include infrared-light components such as infrared-light component 60. Component 60 may include an infrared-light-emitting component such as component 58 (e.g., one or more infrared light-emitting diodes, infrared lasers, or other infrared light generating circuitry) and/or may include an infrared-light-detecting component such as component 52 (e.g., one or more infrared light detectors such as photodiodes, phototransistors, other photodetectors, infrared digital image sensors (infrared cameras), and/or other infrared components). Component 60 may form a proximity sensor, distance sensor, depth sensor, image sensor, and/or other suitable infrared sensor. As an example, component 60 may be an infrared depth sensor such as a structured light depth sensor that includes an array of lasers or other light-emitting device that emits beams of infrared light or other structured light and that includes an infrared digital image sensor for capturing images of objects illuminated with the emitted infrared light.

Layer 30 may be transparent to infrared light (e.g., at wavelengths of 700 nm to 2500 nm, at wavelengths of 700 to 1000 nm, or other suitable infrared wavelengths such as near infrared wavelengths). As an example, layer 30 may exhibit a transmittance of at least 50%, at least 60%, at least 70%, at least 80%, at least 90%, at least 95%, at least 98%, and/or less than 99.9% at infrared wavelengths of at least 700 nm, 750 nm, 780 nm, at least 800 nm, 780-2500 nm, less than 2000 nm, or other suitable wavelengths. Due to the infrared transparency of layer 30, infrared light 54 that is emitted by component 52 may be transmitted through layer 30 from interior 26 to exterior 28 and infrared light 56 (e.g., reflected portions of light 54) to be sensed by infrared-light-detecting component 58 may be transmitted through layer 30 from exterior 28 to interior 26.

To form a one way mirror, an outwardly facing portion of layer 30 (e.g., one or more of the outermost layers 31 of FIG. 2) may be a visible-light reflective layer and an inwardly facing portion of layer 31 (e.g., one or more of the innermost layers 31 of FIG. 2 or other layer 31 that is interposed between the reflective layer and eye boxes 36) may be a visible light absorbing layer. In an illustrative configuration, the visible-light reflective layer may reflect more visible light than it absorbs and the visible-light absorbing layer may absorb more visible light than it reflects (e.g., at visible light wavelengths of 390 to 700 nm). The visible-light reflective layer may also reflect more visible light (e.g., at visible light wavelengths of 390 to 700 nm) than the visible-light absorbing layer and the visible light absorbing layer may absorb more visible light (e.g., at visible light wavelengths of 390 to 700 nm) than the visible light reflecting layer. The reflective layer in layer 30 may, as an example, exhibit a mirror reflectivity of about 20-80%, at least 30%, less than 70%, or other suitable reflectivity to visible light from exterior 28 and a light absorption of less than 30%, less than 10%, less than 5%, less than 2%, at least 1%, or other suitable amount. The visible light absorbing layer may exhibit a visible light absorption of at least 25%, 20-80%, at least 30%, at least 44%, less than 80%, less than 60%, or other suitable absorption for visible light (e.g., at visible light wavelengths of 390 to 700 nm) passing through layer 30 from exterior 28 to interior 26 and may exhibit a visible light reflection (e.g., at visible light wavelengths of 390 to 700 nm) of less than 30%, less than 10%, less than 5%, less than 2%, at least 1%, or other suitable amount.

With an outer visible light reflecting layer and an inner visible light absorbing layer, layer 30 will form a one-way mirror and will have a shiny appearance to external viewer 62. The shiny appearance of the outer surface of layer 30 to external viewer 62 helps block components 44 in interior region 26 from view from the exterior of device 10. The reflective layer and the light absorbing layer may be configured to exhibit sufficient visible-light transmittance (e.g., 80-20%, less than 70%, less than 30%, less than 15%, etc.) to allow visible light components 46 to operate through layer 30. At the same time, the reflective portion and the visible-light absorbing portion of layer 30 are sufficiently transparent to infrared light to allow infrared components 60 to operate satisfactorily through layer 30 (e.g., the one-way mirror may be an infrared-transparent one-way mirror).

Visible light 48 may, as an example, correspond to image light from object 50 (e.g., light from the real-world environment surrounding device 10) and may be used to gather real-world images (e.g., to present to a user, to use in a visual odometry system, etc.).

Infrared light 54 that is emitted by component 52 may be a single light beam (e.g., for lidar), may be multiple light beams (e.g., for a structured light sensor that projects multiple parallel beams of light), may be infrared flood illumination, may be infrared light emitted for an infrared proximity sensor, and/or may be other infrared light). Infrared light 56 that is received by component 58 may be infrared image light (e.g., when component 58 is an infrared image sensor), may be light received as part of a structured light depth sensing arrangement (e.g., when component 52 emits multiple light beams or other structured light), may be a reflected or backscattered infrared light beam in a lidar system or proximity sensor system, and/or may be other infrared light.

To form the infrared-transparent one-way mirror structure of layer 30, layer 30 may, if desired, include one or more thin-film interference filters. By using thin-film interference filter structures in forming the reflective layer portion of layer 30, visible light reflection can be enhanced while maintaining high infrared light transmission.

A thin-film interference filter structure may have a stack of thin-film layers. The layers may include materials such as dielectric materials (e.g., inorganic materials such as silicon oxide, silicon nitride, niobium oxide, titanium oxide, tantalum oxide, aluminum oxide other metal oxides, and/or organic materials such as clear polymers), semiconductors (e.g., silicon layers such as amorphous silicon and polysilicon layers), and metals.

Figure 3:
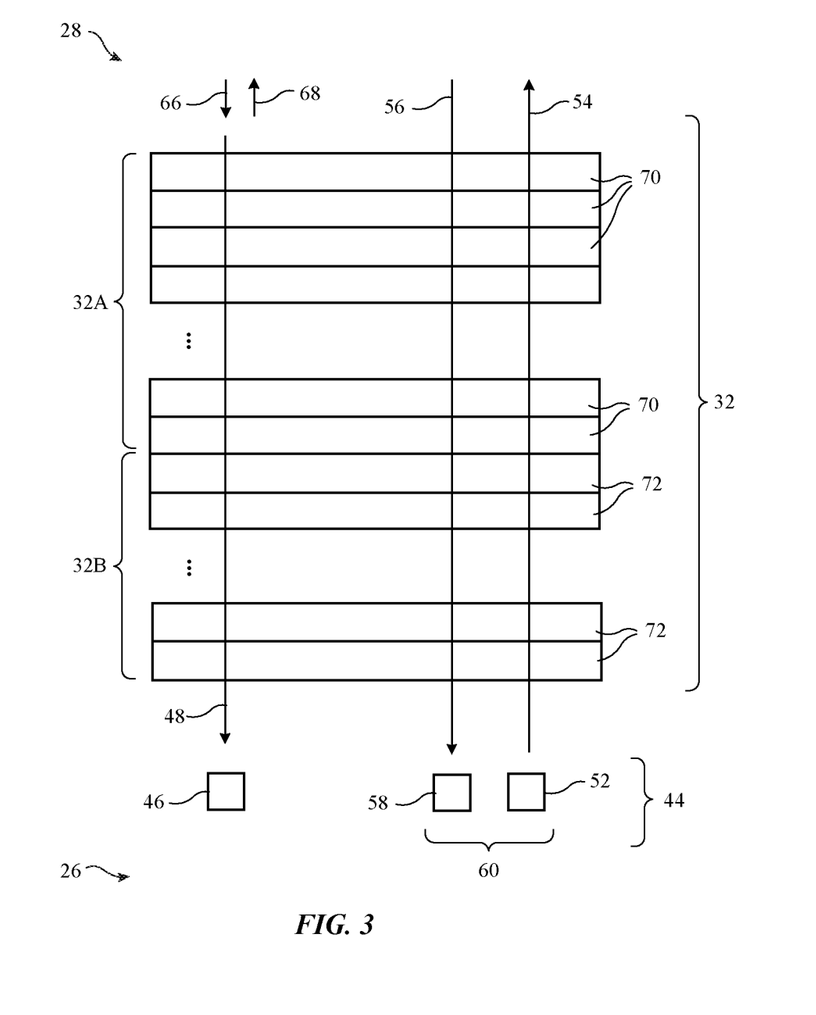
FIG. 3 is a side view of an illustrative coating formed from a dielectric stack in accordance with an embodiment.

In the illustrative configuration of FIG. 3, layer 32 (e.g., a coating layer or other layer 31 in layer 30) has outer thin-film interference filter layer portion 32A and inner thin-film interference filter layer portion 32B. Portion 32A may include thin-film layers 70. Layers 70 may be alternating higher refractive index and lower refractive index layers that form a thin-film interference filter that exhibits good infrared transparency and partial mirror reflectivity at visible light wavelengths. With one illustrative configuration, there are about 20-80 layers 70. The higher index material in layers 70 may be silicon nitride or niobium oxide (as examples). The lower index material in layers 70 may be silicon oxide (as an example). Portion 32B may include thin-film layers 72. Layers 72 may be alternating higher refractive index and lower refractive index layers that form a thin-film interference filter that exhibits good infrared transparency and may contribute to the mirror reflectivity of layer 32 at visible wavelengths. The lower index material in layers 72 may be, for example, silicon oxide. The higher index material in layers 72 may be, for example, silicon, or other material that absorbs visible light more strongly (by a factor of at least 2, at least 5, at least 10, less than 100, or other suitable factor) than infrared light.

With this type of thin-film filter arrangement, portion 32A may exhibit mirror reflectivity at visible wavelengths while being transparent to infrared light (e.g., layers 70 and, if desired, some of layers 72) may be used in forming an outer visible light reflecting layer for layer 30) and portion 32B may exhibits visible light absorption while being transparent to infrared light (e.g., layers 72 may be used in forming an inner visible light absorbing layer for layer 30). As a result, layer 32 is transparent at infrared wavelengths and forms a one-way mirror structure (outer reflective layer covering an inner light absorbing layer) at visible wavelengths, as described in connection with FIG. 2. During operation, incoming visible light 66 is partly reflected (see reflected light 68) so that the outer surface of layer 32 appears shiny to viewer 62 while transmitting sufficient visible light 48 to allow visible-light component 46 to operate satisfactorily. The infrared transparency of the reflective layer portion 32A and the visible-light absorbing portion 32B of layer 32 allows infrared component 60 to operate satisfactorily (e.g., by allowing incoming infrared light 56 to reach component 58 and by allowing component 52 to emit infrared light 54 that passes through layer 32).

One or more layers such as illustrative thin-film interference filter layer 32 and, if desired, other types of materials that exhibit infrared light transparency and desired visible light properties (absorption, transmission, and reflection of desired amounts) can be incorporated into layer 30 so that layer 30 forms an infrared-transparent one-way mirror. Illustrative configurations for layer 30 that form infrared-transparent one-way mirrors are shown in FIGS. 4, 5, 6, and 7.

Figure 4:
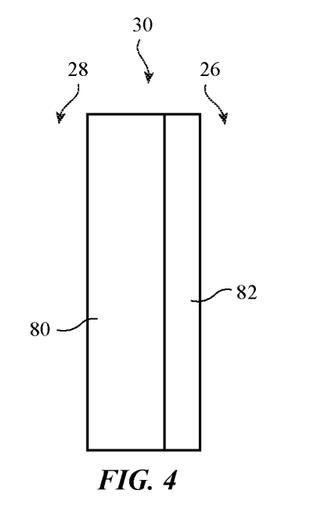
FIGS. 4, 5, 6, and 7 are cross-sectional side views of illustrative layers configured to form infrared transparent one-way mirrors in accordance with embodiments.

In the example of FIG. 4, layer 30 includes layer 80 and layer 82. Layer 80 may be a transparent substrate layer. Layer 80 may be formed from glass, polymer, ceramic, sapphire or other crystalline substrate material, and/or other substrate material. Layer 80 has a first (outwardly facing) surface that faces exterior region 28 and an opposing second (inwardly facing) surface that faces coating 82. Coating 82 has a first (outwardly facing) surface facing layer 80 and an opposing second (inwardly facing) surface facing interior region 26. Coating 82 has reflective and absorptive properties that configure layer 30 to form an infrared-transparent one-way mirror. Coating 82 may be, for example, a coating formed from inorganic layers (e.g., inorganic layers deposited using physical vapor deposition techniques and/or other deposition techniques).

In an illustrative arrangement, coating 82 is formed from a stack of inorganic layers forming thin-film interference filter structures, as described in connection with layer 32 of FIG. 3. For example, layer 82 may include a first portion that is reflective at visible light wavelengths while being transparent at infrared light wavelengths (e.g., a thin-film filter mirror portion) such as portion 32A of FIG. 3 on the inwardly facing surface of layer 80 and may include a second portion (e.g., a thin-film filter structure) that absorbs visible light and transmits infrared light such as portion 32B of FIG. 3 on the inwardly facing side of portion 32A (e.g., portion 32A may be between portion 32B and layer 80).

Figure 5:
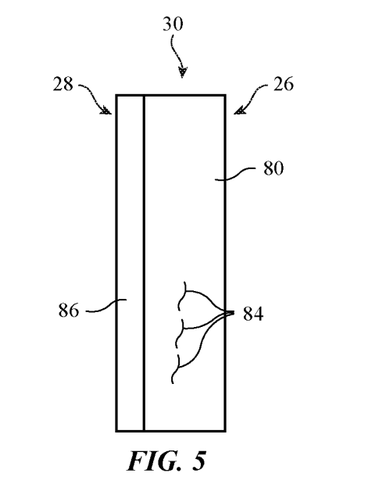

In the example of FIG. 5, coating layer 86 is formed on an outwardly facing side of layer 30 and substrate 80 is formed on an inwardly facing side of layer 30. Layer 80 may be formed from glass, polymer (e.g., molded plastic), ceramic, sapphire or other crystalline substrate material, and/or other substrate material. The material that forms layer 80 may incorporate dye 84 or other light-absorbing material (e.g., pigment) that provides layer 80 with a desired amount of light absorption at visible wavelengths (e.g., layer 80 may be a light-absorbing substrate such as a layer of glass or polymer with a tint and may serve both as a substrate and as the inner visible light absorbing layer for layer 30). Layer 80 may be transparent at infrared wavelengths (e.g., more transparent than at visible light wavelengths). Coating layer 86 may be a reflective coating at visible light wavelengths and may be transparent at infrared wavelengths (e.g., more transparent than at visible wavelengths). Layer 86 may be a thin-film interference filter (see, e.g., portion 32A of layer 32 of FIG. 3) and/or may include a thin layer of metal or other layer that exhibits partial reflection and partial transmission at visible light wavelengths while being transparent at infrared wavelengths.

Figure 6:
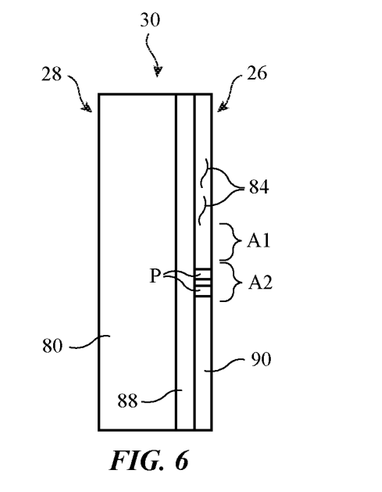

Another illustrative configuration for layer 30 is shown in FIG. 6. In the example of FIG. 6, layer 30 has a transparent outer substrate layer such as substrate layer 80. Coating layer 88 may be formed on the side of substrate layer 80 facing interior 26. Coating layer 88 may be a reflective coating (e.g., a thin-film interference filter such as portion 32A of FIG. 3 or a thin metal layer). Layer 90 may form a coating on the inner surface of layer 88. Layer 90 may be a visible-light-absorbing layer formed from a polymer or other material that includes visible-light absorbing material (e.g., material 84 such as dye or pigment). Layers 88 and 90 may be transparent at infrared wavelengths (e.g., more transparent than at visible wavelengths).

If desired, different areas of layer 90 may have different configurations. For example, perforations P may be selectively formed in an area of layer 90 such as area A2 to enhance light transmission. Components 44 may be overlapped by area A2 (as an example). Other areas of layer 90 such as area A1 may be free of perforations P. In other configurations, layer 90 has different thicknesses in areas A1 and A2 (e.g., area A2 may be thinner to enhance visible and/or infrared light transmission for components 44).

One or more of layers 31 in layer 30 may be configured to impart a desired color cast to layer 30. For example, a thin-film interference layer structure in layer 30 may be configured to exhibit a desired color cast (reddish, bluish, other non-neutral color casts, etc.) and/or a polymer layer or substrate layer in layer 30 may be provided with a desired colorant (e.g., a tint such as reddish or bluish dye or pigment, etc.). In this way, layer 30 may be provided with a desired color. All or part of the area covered by layer 30 may be provided with a desired color. Graded shading effects and other appearances that vary across the surface of layer 30 may also be provided by configuration of the interference filter structures and/or colorant patterns in layers 31.

Figure 7:
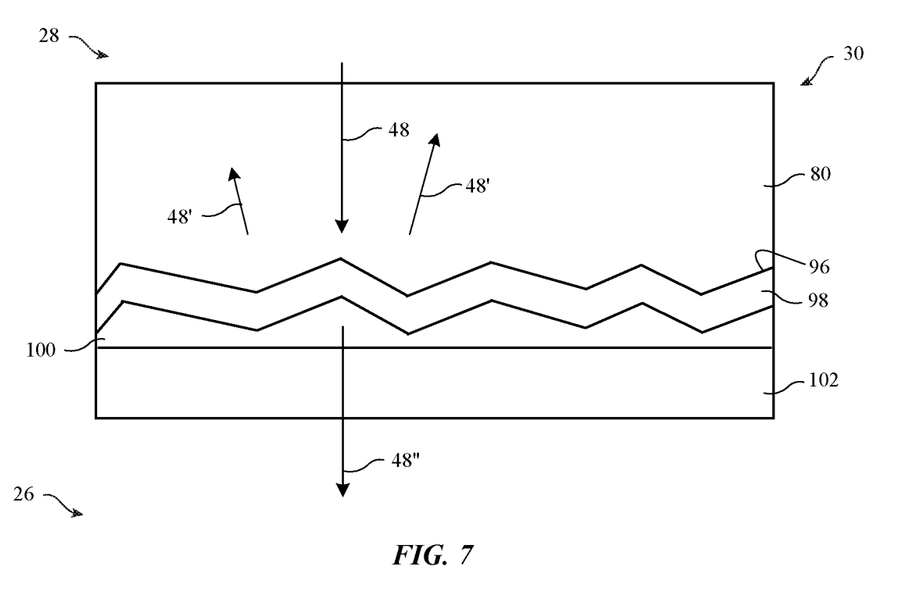

Another illustrative configuration for layer 30 is shown in FIG. 7. As shown in FIG. 7, layer 30 may include a substrate such as substrate 80 with a textured inner surface 96. Layer 98 may be formed from a layer such as layer 32 or a layer such as portion 32A of layer 32. For example, layer 98 may be a stack of inorganic layers of alternating refractive index configured to form a thin-film interference filter structure that is partially reflective at visible light wavelengths while being transparent at infrared light wavelengths (e.g., a visible light reflecting layer). Layer 102 may be a visible light absorbing layer (e.g., a thin-film interference layer structure such as portion 32B of FIG. 3, a polymer containing a visible-light absorbing dye, pigment, or other material that absorbs visible light, or other visible light absorbing material). Layer 102 may be transparent at infrared wavelengths.

If desired, adhesive 100 may be used to attach layer 102 to layer 98. Adhesive 100 may be transparent at visible and infrared wavelengths. With this type of arrangement, incoming visible light 48 is partially reflected by layer 98. Because layer 98 is formed on a textured surface, reflected light 48' will be diffuse and layer 98 will have a matte appearance. The refractive index of layer 100 can be matched to that of layer 98 (e.g., the inner most layer of layer 98) within 10%, 5%, 2%, 1%, or other suitable amount and the distance between layer 98 and components 44 (e.g., visible light component 46) can be small (e.g., less than 1 mm, less than 0.3 mm, at least 0.001 mm, or other suitable distance), so that transmitted light 48" will not be scattered significantly before reaching component 46 (e.g., incoming light sees little haze). Layer 98 will therefore appear matte in reflection, but will not diffuse transmitted light 48" significantly. Arrangements of the type shown in FIG. 7 may be used to create a matte appearance (at visible light wavelengths) for layer 30 while allowing layer 30 to serve as an infrared-transparent one-way mirror for covering components 44 so that components 44 can operate at visible and infrared wavelengths of interest.

The foregoing is merely illustrative and various modifications can be made to the described embodiments. The foregoing embodiments may be implemented individually or in any combination.

What is claimed is:

1. An electronic device, comprising:
    a head-mountable support structure;
    a layer supported by the head-mountable support structure that is configured to separate an exterior region from an interior region and that is partially transparent to visible light passing from the exterior region to eye boxes in the interior region; and
    optical sensors configured to operate through the layer at a visible light wavelength and at an infrared light wavelength, wherein the layer includes a visible-light reflecting layer and a visible-light absorbing layer, wherein the visible-light reflecting layer reflects more visible light at the visible light wavelength than the visible-light absorbing layer, wherein the visible-light-absorbing layer absorbs more visible light than the visible-light reflecting layer at the visible light wavelength, and wherein the layer is more transparent at the infrared light wavelength than at the visible light wavelength.

2. The electronic device defined in claim 1 wherein the optical sensors comprise:
    a visible light camera configured to operate at the visible light wavelength;
    an infrared light source configured to operate at the infrared light wavelength; and
    an infrared light sensor configured to operate at the infrared light wavelength.

3. The electronic device defined in claim 2 wherein the layer supported by the head-mountable support structure comprises a substrate layer that is transparent at the visible light wavelength.

4. The electronic device defined in claim 3 wherein the visible-light reflecting layer comprises a thin-film interference filter structure formed from a stack of inorganic layers.

5. The electronic device defined in claim 4 wherein the visible-light absorbing layer comprises a polymer coating on the thin-film interference filter structure.

6. The electronic device defined in claim 5 wherein the thin-film interference filter structure is interposed between the substrate layer and the polymer coating.

7. The electronic device defined in claim 5 wherein the polymer coating includes a dye configured to absorb more visible light at the visible light wavelength than infrared light at the infrared light wavelength.

8. The electronic device defined in claim 3 wherein the visible-light reflecting layer and the visible-light absorbing layer are formed from first and second respective portions of a thin-film interference filter that includes a stack of inorganic layers with alternating refractive index values.

9. The electronic device defined in claim 2 wherein the visible-light absorbing layer comprises a visible-light absorbing substrate and wherein the visible-light reflecting layer comprises a thin-film interference filter layer formed as a coating on the substrate.

10. The electronic device defined in claim 9 wherein the visible-light absorbing layer comprises a molded polymer layer containing dye.

11. The electronic device defined in claim 2 wherein the visible-light reflecting layer comprises a first stack of inorganic materials of alternating refractive index and wherein the visible-light absorbing layer comprises a second stack of inorganic materials.

12. The electronic device defined in claim 11 wherein the second stack of inorganic materials includes alternating layers of first and second materials, wherein the first material is a dielectric and wherein the second material comprises a material that absorbs more light at the visible light wavelength than at the infrared light wavelength.

13. The electronic device defined in claim 12 wherein the second material comprises silicon.

14. Apparatus, comprising:
    a support structure;
    a layer supported by the support structure that is configured to separate a first region from a second region and that is partially transparent to visible light passing from the first region to the second region; and
    optical sensors in the second region that are configured to operate through the layer at a visible light wavelength and at an infrared light wavelength, wherein the layer includes a visible-light reflecting layer and a visible-light absorbing layer, wherein the visible-light reflecting layer is between the first region and the visible-light absorbing layer, wherein the visible-light absorbing layer is between the visible-light reflecting layer and the second region, wherein the visible-light reflecting layer reflects more visible light at the visible light wavelength than the visible-light absorbing layer, wherein the visible-light-absorbing layer absorbs more visible light than the visible-light reflecting layer at the visible light wavelength, and wherein the layer supported by the support structure is more transparent at the infrared light wavelength than at the visible light wavelength.

15. The apparatus defined in claim 14 wherein the visible-light reflecting layer comprises a thin-film interference filter layer having a stack of inorganic layers.

16. The apparatus defined in claim 15 wherein the visible-light absorbing layer comprises a molded polymer layer containing material that absorbs visible light more than infrared light and wherein the stack of inorganic layers forms a coating on the molded polymer layer.

17. The apparatus defined in claim 15 wherein the layer comprises a substrate, wherein the visible-light absorbing layer comprises a polymer layer that absorbs visible light, wherein the polymer layer includes perforations, and wherein the visible-light reflecting layer is interposed between the visible-light absorbing layer and the substrate.

18. The apparatus defined in claim 14 wherein the layer comprises a substrate and wherein the visible-light reflecting layer and the visible-light absorbing layer are formed from a thin-film interference layer coating on the substrate.

19. An electronic device, comprising:
a head-mountable support structure;
an infrared-transparent one-way mirror coupled to the head-mountable support structure;
a visible light camera configured to receive visible light through the infrared-transparent one-way mirror;
an infrared light-emitting device configured to emit infrared light through the infrared-transparent one-way mirror; and
an infrared light camera configured to receive infrared light through the infrared-transparent one-way mirror.

20. The electronic device defined in claim 19 wherein the infrared-transparent one-way mirror comprises a visible-light reflecting layer configured to partially reflect visible light and comprises a visible-light absorbing layer that is configured to absorb visible light and that is interposed between the visible-light reflecting layer and the visible light camera.

21. The electronic device defined in claim 19 wherein the infrared-transparent one-way mirror has a non-neutral color cast.

22. The electronic device defined in claim 19 wherein the infrared-transparent one-way mirror comprises a thin-film interference filter.

23. An electronic device, comprising:
an infrared-transparent one-way mirror;
a visible light camera configured to receive visible light through the infrared-transparent one-way mirror, wherein the infrared-transparent one-way mirror comprises:
a substrate having a textured surface;
a thin-film interference filter on the textured surface; and
a visible-light absorbing layer, wherein the thin-film interference filter is between the textured surface and the visible-light absorbing layer;
an infrared light-emitting device configured to emit infrared light through the infrared-transparent one-way mirror; and
an infrared light camera configured to receive infrared light through the infrared-transparent one-way mirror.

24. The electronic device defined in claim 23 further comprising an adhesive layer between the visible-light absorbing layer and the thin-film interference filter.

* * * * *